US012104257B2

(12) United States Patent
Terashima et al.

(10) Patent No.: US 12,104,257 B2
(45) Date of Patent: Oct. 1, 2024

(54) ELECTRICAL STEEL SHEET WITH INSULATING FILM

(71) Applicant: JFE Steel Corporation, Tokyo (JP)

(72) Inventors: Takashi Terashima, Tokyo (JP); Karin Kokufu, Tokyo (JP); Makoto Watanabe, Tokyo (JP); Toshito Takamiya, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 17/769,061

(22) PCT Filed: Jun. 25, 2020

(86) PCT No.: PCT/JP2020/024932
§ 371 (c)(1),
(2) Date: Apr. 14, 2022

(87) PCT Pub. No.: WO2021/084793
PCT Pub. Date: May 6, 2021

(65) Prior Publication Data
US 2024/0102172 A1 Mar. 28, 2024

(30) Foreign Application Priority Data
Oct. 31, 2019 (JP) ................................ 2019-198433

(51) Int. Cl.
*C23C 26/00* (2006.01)
*B05D 1/28* (2006.01)

(52) U.S. Cl.
CPC ................ *C23C 26/00* (2013.01); *B05D 1/28* (2013.01); *B05D 2202/15* (2013.01); *B05D 2401/20* (2013.01)

(58) Field of Classification Search
None
See application file for complete search history.

(56) References Cited

U.S. PATENT DOCUMENTS 3,856,568 A 12/1974 Tanaka et al.
3,985,583 A 10/1976 Shimanaka et al.
(Continued)

FOREIGN PATENT DOCUMENTS

CN 101223300 A 7/2008
CN 102803521 A 11/2012
(Continued)

OTHER PUBLICATIONS

Sakurai—JP H08-239771 A—IDS—MT—silicon steel w—fibrous silica—improves tensile—1996 (Year: 1996).*
(Continued)

*Primary Examiner* — John Vincent Lawler
(74) *Attorney, Agent, or Firm* — Buchanan Ingersoll & Rooney PC

(57) ABSTRACT

An electrical steel sheet with an insulating film, the steel sheet having an insulating film containing a crystalline fibrous material on a surface of the steel sheet, in which a ratio ($L_{RD}/L_{TD}$) of a length in a rolling direction ($L_{RD}$) of the crystalline fibrous material in a cross section in the rolling direction of the insulating film to a length in a direction perpendicular to the rolling direction ($L_{TD}$) of the crystalline fibrous material in a cross section in the direction perpendicular to the rolling direction of the insulating film is 1.5 or more and 50.0 or less.

21 Claims, 2 Drawing Sheets

(56) References Cited

U.S. PATENT DOCUMENTS

| | | | | | |
|---|---|---|---|---|---|
| 5,629,251 | A * | 5/1997 | Miyata | C23C 30/00 501/118 |
| 2009/0233114 | A1 | 9/2009 | Takeda et al. | |
| 2012/0088096 | A1 | 4/2012 | Takeda et al. | |
| 2016/0276081 | A1 | 9/2016 | Omura et al. | |
| 2019/0271087 | A1 * | 9/2019 | Takeda | C23C 22/20 |
| 2019/0367746 | A1 * | 12/2019 | Takeda | C09D 7/70 |
| 2022/0145472 | A1 * | 5/2022 | Takahashi | C23C 22/46 |

FOREIGN PATENT DOCUMENTS

| | | | | | |
|---|---|---|---|---|---|
| EP | 1 903 125 | A1 | | 3/2008 | |
| EP | 2 548 977 | A1 | | 1/2013 | |
| JP | 4839338 | A | | 6/1973 | |
| JP | 5079442 | A | | 6/1975 | |
| JP | H02/111659 | | * | 4/1990 | C04B 35/16 |
| JP | 0867913 | A | | 3/1996 | |
| JP | 08239771 | A | | 9/1996 | |
| JP | H08/239771 | A | * | 9/1996 | C21D 9/46 |
| JP | 09235679 | A | | 9/1997 | |
| JP | H09-235679 | A | * | 9/1997 | C22C 38/00 |
| JP | 2000323318 | A | * | 11/2000 | H01F 1/16 |
| JP | 2001303261 | A | * | 10/2001 | C21D 8/12 |
| JP | 2012031498 | A | | 2/2012 | |
| JP | 2019021920 | A | | 2/2019 | |
| WO | 2007136115 | A1 | | 11/2007 | |
| WO | 2010146821 | A1 | | 12/2010 | |
| WO | 2018079845 | A1 | | 5/2018 | |
| WO | 2018174275 | A1 | | 9/2018 | |

OTHER PUBLICATIONS

Kanai—JP H09-235679 A—IDS—MT—low iron loss w-planar & rod alumina—1997 (Year: 1997).*

Yamaguchi—JP 2000-323318 A—Euro D2—MT—anisotropic coatig on silicon steel—2000 (Year: 2000).*

Yamaguchi—JP 2001-303261 A—Euro D3—MT—steel sheet w—anisotropic film—2001 (Year: 2001).*

Li—Mechanisms of ultralow & anisotropic thermal expansion in cordierite—J.Amer.Cer.Soc.—2018 (Year: 2018).*

American Elements—Cordierite—Density—B Feb. 29, 2024 (Year: 2024).*

AZO Materisl—silica—density—Feb. 29, 2024 (Year: 2024).*

Millipore Sigma—Magnesium phosphate 53408-95-0—Feb. 29, 2024 (Year: 2024).*

Study Smarter—Thermal Expansion—Definition & Formula—Mar. 3, 2024 (Year: 2024).*

Morinaga—JP H02-111659 A—Remarks—MT—prod. low thermal expansion cordierite—1990 (Year: 1990).*

Nadafan—Remarks—optical constants dielectric prop nanocrystalline cordierite—J.Asian Ceram. Soc—2020 (Year: 2020).*

International Search Report and Written Opinion for International Application No. PCT/JP2020/024932, dated Sep. 1, 2020, 6 pages.

Office Action issued Jan. 11, 2023, by the Canadian Intellectual Property Office in corresponding Canadian Patent Application No. 3,151,419. (5 pages).

Office Action (The First Office Action) issued Sep. 20, 2023, by the State Intellectual Property Office of People's Republic of China in corresponding Chinese Patent Application No. 202080072374.8 and an English translation of the Office Action. (17 pages).

The extended European Search Report issued Sep. 28, 2022, by the European Patent Office in corresponding European Patent Application No. 20882529.9-1103. (10 pages).

* cited by examiner

ELECTRICAL STEEL SHEET WITH INSULATING FILM

CROSS REFERENCE TO RELATED APPLICATIONS

This is the U.S. National Phase application of PCT/JP2020/024932, filed Jun. 25, 2020, which claims priority to Japanese Patent Application No. 2019-198433, filed Oct. 31, 2019 the disclosures of these applications being incorporated herein by reference in their entireties for all purposes.

FIELD OF THE INVENTION

The present invention relates to an electrical steel sheet with an insulating film. In particular, the present invention relates to an electrical steel sheet with an insulating film which is excellent in terms of magnetic properties and the film adhesion properties of the insulating film and, especially, to a grain-oriented electrical steel sheet with an insulating film.

BACKGROUND OF THE INVENTION

An electrical steel sheet is a soft magnetic material which is widely used as an iron core material for rotators and stators. In particular, a grain-oriented electrical steel sheet is a soft magnetic material which is used as an iron core material for transformers and electric generators and which has a crystalline texture in which the <001> orientation, which is an easily magnetized axis of iron, is highly oriented in the rolling direction of the steel sheet. Such a texture is formed through secondary recrystallization in which crystal grains with a (110) [001] orientation, which is called a Goss orientation, are preferentially grown into huge grains when secondary recrystallization annealing is performed in the manufacturing process of the grain-oriented electrical steel sheet.

Generally, an insulating film composed mainly of phosphate (phosphate film) is formed on the surface of a grain-oriented electrical steel sheet. The phosphate film is formed on the surface of the grain-oriented electrical steel sheet to provide an insulation capability and tension, thereby improving magnetic properties. In addition, the phosphate film is required to have satisfactory practical performances such as workability, film adhesion properties, and a rust-prevention capability. Since the phosphate film is formed at a high temperature higher than 800° C. and has a lower thermal expansion coefficient than a steel sheet, the steel sheet is provided with tension due to the difference in the thermal expansion coefficient between the steel sheet and the film when the temperature is decreased to room temperature, which results in the effect of decreasing iron loss. Also in the case of a non-oriented electrical steel sheet, it is preferable that the steel sheet be provided with tensile stress to decrease the degree of deterioration in properties due to compressive stress. Therefore, in the industrial field of a grain-oriented electrical steel sheet, it is required that the steel sheet be provided with as high tension as possible, for example, a tension of 8 MPa or more, as described in Patent Literature 1.

To meet such a requirement, various kinds of vitreous films have been proposed to date. For example, Patent Literature 2 proposes a film composed mainly of magnesium phosphate, colloidal silica, and chromic anhydride, Patent Literature 3 proposes a film composed mainly of aluminum phosphate, colloidal silica, and chromic anhydride, and Patent Literature 4 proposes a film utilizing fibrous colloidal silica.

Since the thermal expansion coefficients of such films are isotropic, a steel sheet is provided with isotropic tension. It is known that, while there is a decrease in iron loss as a result of magnetic domains being refined in the case where tension is applied in the rolling direction, there is an increase, rather than a decrease, in iron loss in the case where tension is applied in a direction perpendicular to the rolling direction. Examples of a method for preventing such a problem include a technique disclosed in Patent Literature 5. In the case of the technique disclosed in Patent Literature 5, tension provided in the rolling direction and tension provided in a direction perpendicular to the rolling direction are controlled by varying the thickness of an insulating film in a direction perpendicular to the rolling direction.

PATENT LITERATURE

PTL 1: Japanese Unexamined Patent Application Publication No. 8-67913

PTL 2: Japanese Unexamined Patent Application Publication No. 50-79442

PTL 3: Japanese Unexamined Patent Application Publication No. 48-39338

PTL 4: Japanese Unexamined Patent Application Publication No. 8-239771

PTL 5: Japanese Unexamined Patent Application Publication No. 2001-303261

SUMMARY OF THE INVENTION

However, in the case of the method according to Patent Literature 5, to form a film whose thickness varies in the width direction of the steel sheet, a special application method is necessary when coating is performed, or it is necessary to control film thickness by performing processing after uniform coating has been performed, which results in a problem of a deterioration in manufacturing costs, yield, and productivity. Although it is considered possible to solve such a problem if forming a film having a thermal expansion property which differs between the rolling direction and a direction perpendicular to the rolling direction is possible by performing application and baking, it is difficult to achieve such a film with conventional techniques, in which a film composed mainly of vitreous materials is formed, because such materials have isotropic thermal expansion coefficients.

An object according to aspects of the present invention is to provide an electrical steel sheet with an insulating film which provides higher tension in the rolling direction than in a direction perpendicular to the rolling direction and which is excellent in terms of film adhesion properties.

The present inventors found that it is possible to realize the same effect as that according to Patent Literature 5 by forming an insulating film containing a highly oriented crystalline fibrous material, which led to the completion of aspects of the present invention.

That is, aspects of the present invention are as follows.

[1] An electrical steel sheet with an insulating film, the steel sheet having an insulating film containing a crystalline fibrous material on a surface of the steel sheet, in which a ratio ($L_{RD}/L_{TD}$) of a length in a rolling direction ($L_{RD}$) of the crystalline fibrous material in a cross section in the rolling direction of the insulating film to a length in a direction perpendicular to the rolling direction ($L_{TD}$) of the crystalline fibrous material in a cross section in the direction perpendicular to the rolling direction of the insulating film is 1.5 or more and 50.0 or less.

[2] The electrical steel sheet with an insulating film according to item [1], in which a ratio ($L_{ND}$/d) of a length in a thickness direction ($L_{ND}$) of the crystalline fibrous material in a cross section in the direction perpendicular to the rolling direction of the insulating film to an insulating film thickness (d) is 0.2 or more and 2.0 or less.

[3] The electrical steel sheet with an insulating film according to item [1] or [2], in which a volume thermal expansion coefficient of the crystalline fibrous material in a temperature range of 25° C. to 800° C. is $30\times10^{-6}$/K or less.

[4] The electrical steel sheet with an insulating film according to any one of items [1] to [3], in which a linear thermal expansion coefficient of the crystalline fibrous material in a temperature range of 25° C. to 800° C. is anisotropic.

[5] The electrical steel sheet with an insulating film according to any one of items [1] to [4], in which the insulating film contains a phosphate containing one, two, or more metallic elements selected from Mg, Al, Ca, Ba, Sr, Zn, Ti, Nd, Mo, Cr, B, Ta, Cu, and Mn.

According to aspects of the present invention, it is possible to provide an electrical steel sheet with an insulating film which provides higher tension in the rolling direction than in a direction perpendicular to the rolling direction and which is excellent in terms of film adhesion properties.

According to aspects of the present invention, by controlling tension provided by an insulating film in the rolling direction of a steel sheet and tension provided by the insulating film in a direction perpendicular to the rolling direction, it is possible to provide an electrical steel sheet with an insulating film in which there is an improvement in iron loss, film adhesion property at slit edges when slitting work is performed, and film adhesion property when bending work is performed.

DETAILED DESCRIPTION OF EMBODIMENTS OF THE INVENTION

Figure 1:
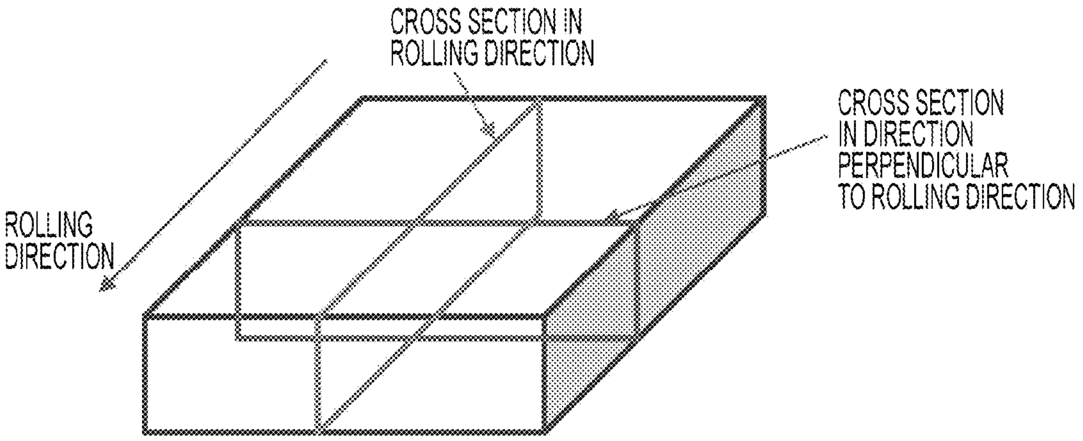
FIG. 1 is a schematic diagram illustrating the definition of a cross section in the rolling direction and a cross section in a direction perpendicular to the rolling direction in accordance with aspects of the present invention.

Experimental results which formed the basis of aspects of the present invention will be described.

First, samples were manufactured in the following manner.

A steel sheet having a length in the rolling direction of 300 mm and a length in a direction perpendicular to the rolling direction of 100 mm was taken by shearing a grain-oriented electrical steel sheet having a thickness of 0.20 mm which had been manufactured by using a known method and subjected to finish annealing, then unreacted annealing separator was removed, and stress relief annealing (at 800° C. for 2 hours in a $N_2$ atmosphere) was performed. A film composed mainly of forsterite has been formed on the surface of the steel sheet. Subsequently, light pickling was performed in a 5 mass % phosphate aqueous solution. Subsequently, an insulating film was formed in the following manners on the steel sheet which had been subjected to light pickling.

(Conventional example 1) An insulating film described in Example 2 in Patent Literature 2 was formed as described in Patent Literature 2. Here, the total coating weight of the insulating film was 9 g/m$^2$ on both sides of a steel sheet after having been dried.

(Conventional example 2) An insulating film described in an example in Japanese Unexamined Patent Application Publication No. 9-78253 was formed as described in this literature. Here, the total coating weight of the insulating film was 9 g/m$^2$ on both sides of a steel sheet after having been dried.

(Example of the present invention) An aqueous solution containing magnesium primary phosphate aqueous solution in an amount of 100 pts·mass in terms of solid content, colloidal silica in an amount of 50 pts·mass in terms of $SiO_2$ solid content, and cordierite in an amount of 10 pts·mass was diluted with pure water so as to have a specific gravity of 1.20 to prepare a treatment solution for forming an insulating film (coating solution). The coating solution was applied to the surface of the steel sheet by using a roll coater so that the total coating weight was 9 g/m$^2$ on both sides of a steel sheet after having been dried. The primary particle of cordierite had a hexagonal column shape having an a-axis length of 0.8 μm and a c-axis length of 4.5 μm. In addition, the linear thermal expansion coefficients in a temperature range of 25° C. to 800° C. of this cordierite were $2.9\times10^{-6}$/K (a-axis direction) and $-1.0\times10^{-6}$/K (c-axis direction), and the volume thermal expansion coefficient in a temperature range of 25° C. to 800° C. was $4.8\times10^{-6}$/K. Subsequently, the sample was charged into a drying furnace, dried at a temperature of 300° C. for 1 minute, and then subjected to baking at a temperature of 850° C. for 30 seconds in an atmosphere containing 100 vol % of $N_2$ to form an insulating film on the surface of the steel sheet.

A sample for each test was taken from each of the electrical steel sheets with an insulating film obtained as described above, and subjected to stress relief annealing (at 800° C. for 2 hours in a $N_2$ atmosphere) before the test was performed. Here, stress relief annealing may be omitted in the case where the sample is taken by using a method in which strain is not applied when the sample is taken or in the case where there is no problem due to the effect of strain as in the case of SEM observation.

Dispersion state of cordierite in the insulating film of the sample obtained as described above was checked by observing a cross section which had been prepared by FIB (focused ion beam) processing by using a backscattered electron image obtained with a SEM (scanning electron microscope) to determine the ratio ($L_{RD}/L_{TD}$) of the length in the rolling direction ($L_{RD}$) to the length in a direction perpendicular to the rolling direction ($I_{TD}$) and the length in the thickness direction ($L_{ND}$) of cordierite and the insulating film thickness (d).

Tension (applied tension in the rolling direction and applied tension in a direction perpendicular to the rolling direction provided to the steel sheet) is determined in the following manner. After having taken a sample for determining the tension in the rolling direction (having a length in the rolling direction of 280 mm and a length in a direction perpendicular to the rolling direction of 30 mm) and a sample for determining the tension in a direction perpendicular to the rolling direction (having a length in the rolling direction of 30 mm and a length in a direction perpendicular to the rolling direction of 100 mm) by cutting the electrical steel sheet with an insulating film obtained as described above and having performed stress relief annealing (at 800° C. for 2 hours in a $N_2$ atmosphere), one side of each of the samples was masked with an adhesive tape so that the insulating film on this side was not removed, the insulating film on the other side was then removed by immersing the sample in a 25 mass % NaOH aqueous solution at a temperature of 110° C., and the warpage of each of the sample for determining the tension in the rolling direction and the sample for determining the tension in a direction perpendicular to the rolling direction was measured. Here, although there was a difference in size between the sample for determining the tension in the rolling direction and the sample for determining the tension in a direction perpendicular to the rolling direction in this case, there is no effect of the size on the determination of the tension. Therefore, the size of the sample capable to determine the tension in each of the directions may be appropriately selected.

Film adhesion property was evaluated by observing the length of a region in which an insulating film was peeled off when the electrical steel sheet with an insulating film obtained as described above was sheared in the rolling direction. At the edge of the sheared sample (sheared edge) having a length of 20 mm, the length was determined in a direction perpendicular to the rolling direction of the region in which an insulating film was peeled off. A case where the maximum length was 100 μm or less was judged as a case of good adhesion property, and a case where the length was more than 100 μm was judged as a case of poor adhesion property. Although there is no particular limitation on the method used for determining the length of the region in which an insulating film was peeled off, the length may be determined, for example, by performing SEM observation at a magnification of 50 times.

The determination of a magnetic property (iron loss ($W_{17/50}$)) was performed by using the method in accordance with JIS C 2550 on a sample having a length in a direction perpendicular to the rolling direction of 30 mm and a length in the rolling direction of 280 mm which had been taken by shearing the electrical steel sheet with an insulating film obtained as described above and which had been subjected to stress relief annealing (at 800° C. for 2 hours in a $N_2$ atmosphere). Here, the magnetic flux density ($B_8$) of all the samples was 1.92 T.

As indicated in Table 1, it is clarified that, by using the insulating film according to Example of the present invention, since it is possible to provide higher tension in the rolling direction than in a direction perpendicular to the rolling direction, it is possible to realize an excellent effect of decreasing iron loss and excellent film adhesion property.

TABLE 1

| | $L_{RD}$ μm | $L_{TD}$ μm | $L_{ND}$ μm | d μm | Tension (MPa) Rolling Direction | Tension (MPa) Direction Perpendicular to Rolling Direction | Iron Loss $W_{17/50}$ (W/kg) | Film Adhesion Property |
|---|---|---|---|---|---|---|---|---|
| Conventional Example 1 | | | | 2.0 | 10.6 | 10.4 | 0.66 | Poor |
| Conventional Example 2 | | | | 1.9 | 9.8 | 9.6 | 0.68 | Poor |
| Example | 4.5 | 0.8 | 0.6 | 1.8 | 10.6 | 6.4 | 0.64 | Good |

Hereafter, each of the constitutions of aspects of the present invention will be described.

As the electrical steel sheet on which the insulating film according to aspects of the present invention is formed, an electrical steel sheet manufactured by using a known method may be used, and either of a grain-oriented electrical steel sheet and a non-oriented electrical steel sheet may be used. Examples of a preferable grain-oriented electrical steel sheet which may be used include the grain-oriented electrical steel sheet which is manufactured by using the following method.

First, the preferable chemical composition of the steel will be described. Hereinafter, "%", which is a unit of the content of each of the elements, denotes "mass %", unless otherwise noted.

C: 0.001% to 0.10%

C is a constituent which is effective for forming crystal grains with the Goss orientation, and it is preferable that the C content be 0.001% or more to effectively realize such a function. On the other hand, in the case where the C content is more than 0.10%, insufficient decarburization may occur, even in the case where decarburization annealing is performed. Therefore, it is preferable that the C content be 0.001% to 0.10%.

Si: 1.0% to 5.0%

Si is a constituent which is necessary to decrease iron loss by increasing electrical resistance and to enable high-temperature heat treatment by stabilizing the BCC microstructure of iron, and it is preferable that the Si content be 1.0% or more. On the other hand, in the case where the Si content is more than 5.0%, it may be difficult to perform ordinary cold rolling. Therefore, it is preferable that the Si content be 1.0% to 5.0%. It is more preferable that the Si content be 2.0% to 5.0%.

Mn: 0.01% to 1.0%

Mn not only effectively contributes to remedy the hot shortness of steel but also functions as a crystal growth inhibitor by forming precipitates such as MnS and MnSe in the case where S and Se exist. To effectively realize such functions, it is preferable that the Mn content be 0.01% or more. On the other hand, in the case where the Mn content is more than 1.0%, the effect as the inhibitor may be lost due to an increase in the grain size of precipitates such as MnSe. Therefore, it is preferable that the Mn content be 0.01% to 1.0%.

sol.Al: 0.003% to 0.050%

Since Al is an effective constituent which functions as an inhibitor by forming a dispersion second phase in the form of AlN in steel, it is preferable that Al be added in the form of sol.Al in an amount of 0.003% or more. On the other hand, in the case where Al is added in the form of sol.Al in an amount of more than 0.050%, the effect as the inhibitor may be lost due to an increase in the grain size of AlN precipitated. Therefore, it is preferable that Al be added in the form of sol.Al in an amount of 0.003% to 0.050%.

N: 0.001% to 0.020%

Since N is, like Al, also a constituent which is necessary to form AlN, it is preferable that the N content be 0.001% or more. On the other hand, in the case where the N content is more than 0.020%, blister or the like may occur when slab is heated. Therefore, it is preferable that the N content be 0.001% to 0.020%.

One or Both Selected from S and Se: 0.001% to 0.05% in Total

S and Se are effective constituents which function as inhibitors by combining with Mn and Cu to form a dispersion second phase in steel in the form of MnSe, MnS, $Cu_2$-xSe, and $Cu_2$-xS. To realize the useful effect due to addition, it is preferable that the total content of S and Se be 0.001% or more. On the other hand, in the case where the total content of S and Se is more than 0.05%, there may be a case where the solid solution formation of S and Se is incomplete when slab heating is performed and where a surface defect also occurs in a product. Therefore, in the case where one or both of S and Se are added, it is preferable that the total content be 0.001% to 0.05%.

It is preferable the constituents described above be the basic constituents of steel. In addition, the remainder of the chemical composition which differs from the constituents described above may be Fe and incidental impurities.

In addition, the chemical composition described above may further contain one, two, or more selected from Cu: 0.2% or less, Ni: 0.5% or less, Cr: 0.5% or less, Sb: 0.1% or less, Sn: 0.5% or less, Mo: 0.5% or less, and Bi: 0.1% or less. By adding elements which function as auxiliary inhibitors, it is possible to further improve magnetic properties. Examples of such elements include the elements described above, which are selected from the viewpoints of crystal grain size and easiness of surface segregation. Although there is no particular limitation on the lower limits of the contents of these elements, to realize the useful effect of each of the elements, it is preferable that the Cu content be 0.01% or more, the Ni content be 0.01% or more, the Cr content be 0.01% or more, the Sb content be 0.01% or more, the Sn content be 0.01% or more, the Mo content be 0.01% or more, and Bi content be 0.001% or more, respectively. In addition, in the case where the content of each of the elements described above is more than the respective upper limits described above, since the surface appearance of the film and secondary recrystallization tend to be poor, it is preferable that the content of each of the elements described above be within the respective ranges.

Moreover, the chemical composition may further contain one, two, or more selected from B: 0.01% or less, Ge: 0.1% or less, As: 0.1% or less, P: 0.1% or less, Te: 0.1% or less, Nb: 0.1% or less, Ti: 0.1% or less, and V: 0.1% or less in addition to the constituents described above. By adding one, two, or more of these elements, since there is a further increase in the effect of inhibiting crystal grain growth, it is possible to stably achieve a higher magnetic flux density. Such an effect becomes saturated in the case where the content of each of these elements is more than the respective upper limits described above. Therefore, in the case where these elements are added, the content of each of these elements is set to be equal to or less than the respective upper limits described above. Although there is no particular limitation on the lower limits of the contents of these elements, to realize the useful effect of each of the elements, it is preferable that the B content be 0.001% or more, the Ge content be 0.001% or more, the As content be 0.005% or more, the P content be 0.005% or more, the Te content be 0.005% or more, the Nb content be 0.005% or more, the Ti content be 0.005% or more, and the V content be 0.005% or more, respectively.

Hereafter, the preferable method for manufacturing an electrical steel sheet with an insulating film will be described.

Molten steel having the chemical composition described above is obtained by steelmaking by using a known refining process and made into a steel material (steel slab) by using a continuous casting method or an ingot casting-blooming method, the steel slab described above is subjected to hot rolling to obtain a hot rolled steel sheet and subjected to hot rolled-sheet annealing as needed, and the hot rolled steel sheet is subjected to cold rolling once or twice or more with intermediate annealing interposed between periods in which cold rolling is performed to obtain a cold rolled steel sheet having a final thickness. Subsequently, it is possible to manufacture an electrical steel sheet with an insulating film by using a manufacturing method consisting of a series of processes, in the following order, of performing primary recrystallization annealing and decarburization annealing, applying an annealing separator composed mainly of MgO, performing final finish annealing to form a film layer composed mainly of forsterite, applying a treatment solution for forming an insulating film (coating solution) having a predetermined chemical composition to form an insulating film, performing a drying treatment as needed, and performing flattening annealing which doubles as baking. Here, examples of a method for manufacturing an electrical steel sheet include, but not limited to, the manufacturing method described above, and various known manufacturing methods may be used. For example, in the case where a separator composed mainly of $Al_2O_3$ or the like is applied after decarburization annealing has been performed, by forming a base film layer by using a CVD method, a PVD method, a sol-gel method, a steel sheet-oxidizing method, or the like after final finish annealing has been performed without forming forsterite, it is possible to form an insulating film on the base film layer. In addition, in the case where the insulating film according to aspects of the present invention is used, it is possible to form an insulating film directly on a base steel surface without forming a base film layer.

In accordance with aspects of the present invention, the term a "crystalline fibrous material" denotes a crystalline material having an aspect ratio of 1.5 or more. Here, the aspect ratio is determined by using the following method.

By observing a crystalline fibrous material (aggregate), which is a measurement object, with a particle image analyzer ("IF-200nano" produced by JASCO International Co., Ltd.), and by calculating the ratio (average Feret length/average Feret width) between the average value of a Feret width (minimum value of the distance between two parallel straight lines which are tangents to a particle image, that is, the minimum Feret diameter) and the average value of a Feret length (Feret diameter perpendicular to the minimum Feret diameter) of 1000 or more grains of a crystalline fibrous material with image analysis software ("PIA-Pro" produced by JASCO International Co., Ltd.), the calculated ratio is defined as the aspect ratio of the crystalline fibrous material.

Here, it is necessary that the fibrous material be crystalline. This is because, in the case where the fibrous material is non-crystalline, since phases surrounding the fibrous material tend to react with the non-crystalline fibrous material when baking is performed at a high temperature, phase boundaries become unclear, which results in the large anisotropy of the tension provided to a steel sheet not being achieved.

As the crystalline fibrous material, a synthetic material or a material on the market may be used. It is preferable that the crystalline fibrous material be an inorganic material. Examples of the inorganic material include $2MgO \cdot 2Al_2O_3 \cdot 5SiO_2$, $Al_2O_3$, $MgO \cdot SiO_2$, $Al_2TiO_5$, CaO—$ZrO_2$, $Y_2O_3 \cdot ZrO_2$, $LaSrAlO_4$, and $Sr_2TiO_4$.

Figure 2:
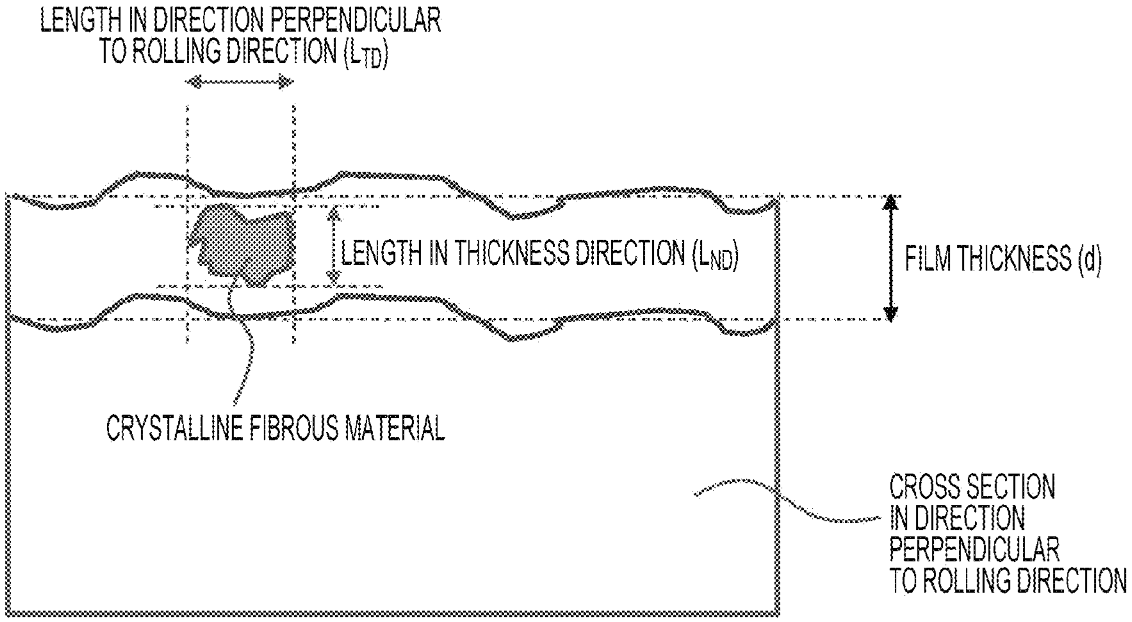
FIG. 2 is a schematic diagram illustrating the definitions of the lengths in a direction perpendicular to the rolling direction ($L_{TD}$) and in the thickness direction ($L_{ND}$) of the crystalline fibrous material in a cross section in a direction perpendicular to the rolling direction of the insulating film.
Figure 3:
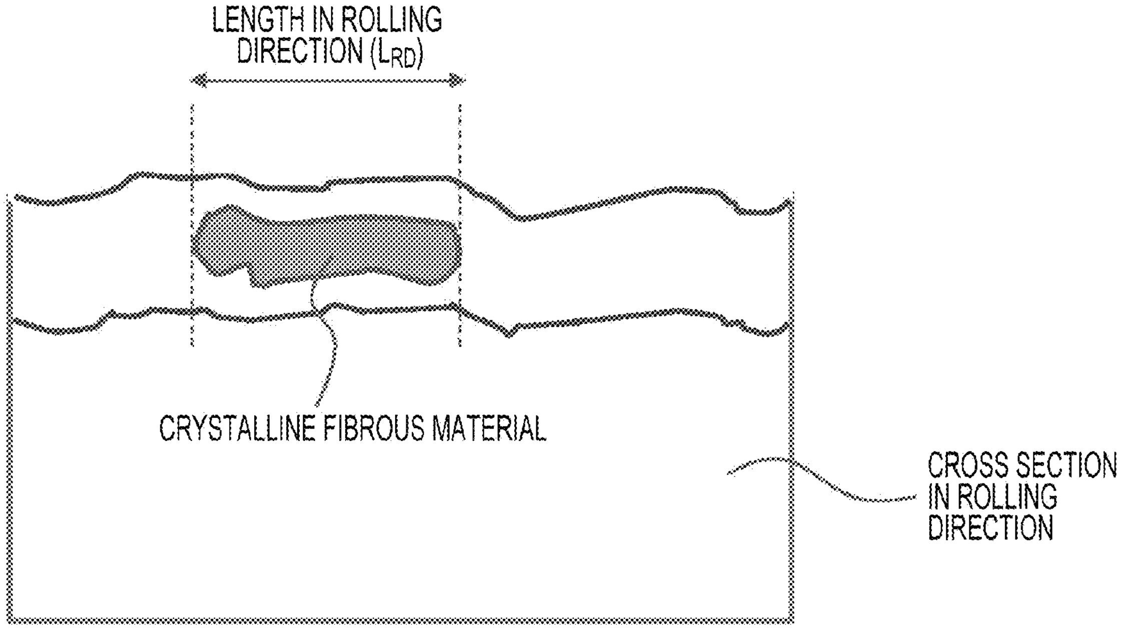
FIG. 3 is a schematic diagram illustrating the definition of the length in the rolling direction ($L_{RD}$) of the crystalline fibrous material in a cross section in the rolling direction of the insulating film.

Regarding the lengths of the crystalline fibrous material in an insulating film, the length in the rolling direction ($L_{RD}$) in a cross section in the rolling direction, the length in a direction perpendicular to the rolling direction ($L_{TD}$) in a cross section in the direction perpendicular to the rolling direction, and the length in the thickness direction ($L_{ND}$) in a cross section in a direction perpendicular to the rolling direction and the insulating film thickness (d) are determined by observing cross sections which have been prepared by FIB processing by using a SEM. The length in a direction perpendicular to the rolling direction ($L_{TD}$), the length in the thickness direction ($L_{ND}$), and the insulating film thickness (d) are determined in a cross section in a direction perpendicular to the rolling direction, and the length in the rolling direction ($L_{RD}$) is determined in a cross section in the rolling direction. It is preferable that such observation be performed by using a backscattered electron image, because this results in sharp contrast in response to the chemical composition of the material. Each of $L_{RD}$, $L_{TD}$, and $L_{ND}$ is defined as the average value of all the corresponding measured values in a field of view in which five or more of the crystalline fibrous materials are recognized. Here, although the crystalline fibrous material exists in an insulating film in the form of a primary particle or in the form of an aggregated particle, that is, a secondary particle, either of them is regarded as a particle as long as it is recognized as one particle. The insulating film thickness (d) is defined as the average value of the film thickness in a cross section in a direction perpendicular to the rolling direction. It is preferable that the average value of the film thickness be determined by obtaining the average information of the film thickness in as wide a range as possible, and, in accordance with aspects of the present invention, the average insulating film thickness is defined as the average film thickness of an insulating film having a width in a direction perpendicular to the rolling direction of 20 μm. FIG. 1 to FIG. 3 schematically illustrate the definitions of various lengths.

Here, it is possible to determine whether the fibrous material in an insulating film is crystalline or non-crystalline by performing electron diffraction analysis with a TEM on a cross section of the insulating film.

The ratio ($L_{RD}/L_{TD}$) of the length in the rolling direction ($L_{RD}$) of the crystalline fibrous material in a cross section in the rolling direction of the insulating film to the length in a direction perpendicular to the rolling direction ($L_{TD}$) of the crystalline fibrous material in a cross section in a direction perpendicular to the rolling direction of the insulating film is set to be 1.5 or more and 50.0 or less. By controlling $L_{RD}/L_{TD}$ to be 1.5 or more, it is possible to increase the effect of decreasing iron loss by providing anisotropy to the tension provided by the insulating film. In addition, by controlling $L_{RD}/L_{TD}$ to be 50.0 or less, it is possible to inhibit a deterioration in the film adhesion property (bending adhesion property) of the insulating film. It is preferable that $L_{RD}/L_{TD}$ be 3.0 or more or more preferably 10.0 or more. It is preferable that $L_{RD}/L_{TD}$ be 40.0 or less or more preferably 30.0 or less.

To increase the degree of anisotropy of the tension provided by the insulating film by increasing the degree of orientation of a crystalline fibrous material, it is preferable that the ratio ($L_{ND}$/d) of the length in the thickness direction ($L_{ND}$) of the crystalline fibrous material in a cross section in a direction perpendicular to the rolling direction of the insulating film to the insulating film thickness (d) be 0.2 or more or more preferably 0.3 or more. In addition, to inhibit a deterioration in the properties of the iron core of a transformer due to a decrease in the lamination factor of a steel sheet, it is preferable that the ratio ($L_{ND}$/d) of the length in the thickness direction ($L_{ND}$) in the cross section to the insulating film thickness (d) be 2.0 or less, more preferably 1.5 or less, or even more preferably 1.0 or less.

To further increase the degree of the anisotropy of the tension provided by the insulating film, it is preferable that the ratio (cross-sectional area of a crystalline fibrous material/cross-sectional area of the insulating film) of the cross-sectional area of a crystalline fibrous material in the insulating film to the cross-sectional area of the insulating film in a cross section in a direction perpendicular to the rolling direction be 0.1 or more and 0.9 or less. It is more preferable that the cross-sectional area ratio be 0.2 or more. In addition, it is more preferable that the cross-sectional area ratio be 0.8 or less.

To increase the tension provided to a steel sheet by the insulating film, it is preferable that the volume thermal expansion coefficient of a crystalline fibrous material in a temperature range of 25° C. to 800° C. be $30\times10^{-6}$/K or less. The volume thermal expansion coefficient may take a minus value. It is more preferable that the volume thermal expansion coefficient be $15\times10^{-6}$/K or less.

To increase the anisotropy of the tension provided to a steel sheet by the insulating film, it is preferable that the linear thermal expansion coefficient of the crystalline fibrous material in a temperature range of 25° C. to 800° C. be anisotropic. Regarding the orientation anisotropy of the linear thermal expansion coefficient (a), it is preferable that $\alpha_{LA}$ be less than $\alpha_{SA}$. It is more preferable that the difference between $\alpha_{LA}$ and $\alpha_{SA}$ be $1.0\times10^{-6}$/K or more. In addition, it is preferable that the difference between $\alpha_{LA}$ and $\alpha_{SA}$ be $20\times10^{-6}$/K or less. Here, "$\alpha_{LA}$" denotes the linear thermal expansion coefficient in the long axis direction of the crystalline fibrous material, and "$\alpha_{SA}$" denotes the linear thermal expansion coefficient in the short axis direction of the crystalline fibrous material.

The volume thermal expansion coefficient and the linear thermal expansion coefficient described above may be obtained by separately preparing a material (crystalline fibrous material existing in the insulating film) identified by performing electron diffraction analysis and by determining such coefficients of the prepared material or may be calculated from literature values if available. Here, the volume thermal expansion coefficient and the linear thermal expansion coefficient of the crystalline fibrous material in a temperature range of 25° C. to 800° C. may be obtained by determining a lattice constant in a temperature range of 25° C. to 800° C., for example, by using a high-temperature X-ray diffractometer.

It is preferable that the content of the crystalline fibrous material in the insulating film be as much as possible, because this results in an increase in the tension provided to a steel sheet. On the other hand, in the case where there is an increase in the content of the crystalline fibrous material, there is a risk in that, since there is an increase in the amount of dust generated, for example, due to tension pads when slitting work is performed, there is a deterioration in working environment. It is preferable that the content of the crystalline fibrous material in the insulating film be 1.0 mass % or more or more preferably 3.0 mass % or more. In addition, it is preferable that the content of the crystalline fibrous material in the insulating film be 50 mass % or less or more preferably 20 mass % or less.

It is preferable that the insulating film contain a phosphate, a borate, a silicate, and the like in addition to the crystalline fibrous material, and it is particularly preferable that the film contain a phosphate, which is generally used for an insulating film nowadays. Since a phosphate tends to take up moisture in the atmosphere, to decrease such a tendency, it is preferable that a phosphate contain one, two, or more metallic elements selected from Mg, Al, Ca, Ba, Sr, Zn, Ti, Nd, Mo, Cr, B, Ta, Cu, and Mn.

The insulating film according to aspects of the present invention may be a Cr-containing insulating film or a Cr-free insulating film. In particular, in the case of a Cr-free insulating film, there is a tendency for tension to decrease compared with the case of a Cr-containing insulating film. In the case of the insulating film according to aspects of the present invention, since it is possible to increase tension by increasing the degree of orientation of the crystalline fibrous material, it is preferable that aspects of the present invention be used for a Cr-free insulating film.

The tension provided to a steel sheet by the insulating film is derived from the warpage (x) of the steel sheet obtained by masking one side of the sample with an adhesive tape so that the insulating film on this side is not removed and by then removing the insulating film on the other side in an alkali, an acid, or the like. More specifically, the warpage is calculated by using (equation 1) below.

$$\text{Tension provided to steel sheet (MPa)} = \text{Young's modulus of steel sheet (GPa)} \times \text{steel sheet thickness (mm)} \times \text{warpage (mm)} + (\text{warpage measurement length (mm)})^2 \times 10^3 \quad \text{(equation 1)}$$

Here, the Young's modulus of the steel sheet is assigned a value of 132 GPa in the case of the rolling direction and 220 GPa in the case of a direction perpendicular to the rolling direction.

In an example of a method for forming an insulating film, a treatment solution for forming an insulating film (coating solution) is prepared by adding a preferable crystalline fibrous material into an aqueous solution containing a phosphate and by stirring the aqueous solution so that the added material is sufficiently dispersed, the prepared solution is applied to the surface of an electrical steel sheet by using, for example, a roll coater, the steel sheet is then dried at a temperature of about 300° C. as needed, and a baking treatment is performed on the steel sheet at a temperature of about 800° C. to 1000° C. Here, although it is possible to control the degree of orientation of the crystalline fibrous material in the insulating film mainly by adjusting the aspect ratio of the crystalline fibrous material, to further actively control the degree of orientation of the crystalline fibrous material, for example, the film thickness of the insulating film may be adjusted, or a shearing force may be applied when the coating solution is applied.

It is preferable that the tension provided by the insulating film in the rolling direction of a steel sheet be 10 MPa or more or more preferably 12 MPa or more. By increasing the tension, it is possible to decrease iron loss and to further decrease a noise when the steel sheet is used for a transformer.

In the case of the insulating film according to aspects of the present invention, the tension provided by the insulating film to a steel sheet has anisotropy. Here, the expression "having anisotropy" denotes a case where the ratio of the tension provided by the insulating film in the rolling direction of the steel sheet to the tension provided in a direction perpendicular to the rolling direction (rolling direction/direction perpendicular to the rolling direction) is 1.05 or more. It is preferable that such a ratio be 1.20 or more.

It is preferable that the insulating film thickness (d) be 0.75 μm or more or more preferably 1.1 μm or more from the viewpoint of interlayer insulation. In addition, it is preferable that the insulating film thickness (d) be 7.5 μm or less or more preferably 6.0 μm or less from the viewpoint of a lamination factor.

It is preferable that the coating weight of the insulating film be appropriately set to achieve the film thickness described above, and, usually, it is preferable that the coating weight be 2.0 g/m$^2$ or more and 15.0 g/m$^2$ or less per side or, in total, 4.0 g/m$^2$ or more and 30.0 g/m$^2$ or less on both sides. In the case where the total coating weight is 4.0 g/m$^2$ or more on both sides, it is easier to improve the interlayer insulation. On the other hand, in the case where the total coating weight is 30.0 g/m$^2$ or less on both sides, it is easy to inhibit a deterioration in lamination factor. It is more preferable that the total coating weight be 6.0 g/m$^2$ or more on both sides. In addition, it is more preferable that the total coating weight be 24.0 g/m$^2$ or less on both sides.

EXAMPLES

Example 1

After having heated a slab for a silicon steel sheet having a chemical composition containing, by mass %, Si: 3.25%, C: 0.04%, Mn: 0.08%, S: 0.002%, sol.Al: 0.015%, N: 0.006%, Cu: 0.05%, Sb: 0.01% at a temperature of 1150° C. for 20 minutes, hot rolling was performed on the heated slab to obtain a hot rolled steel sheet having a thickness of 2.4 mm. After having performed annealing on the hot rolled steel sheet at a temperature of 1000° C. for 1 minute, cold rolling was performed to obtain a cold rolled steel sheet having a final thickness of 0.27 mm. After having taken a steel sheet having a length in the rolling direction of 400 mm and a length in a direction perpendicular to the rolling direction of 100 mm from the obtained cold rolled steel sheet, the steel sheet was heated from room temperature to a temperature of 820° C. at a heating rate of 80° C./s and subjected to primary recrystallization annealing at a temperature of 820° C. for 60 seconds in a wet atmosphere (50 vol % of $H_2$, 50 vol % of $N_2$, a dew-point temperature of 60° C.) in a laboratory. Subsequently, an aqueous slurry of an annealing separator containing MgO in an amount of 100 pts·mass and $TiO_2$ in an amount of 5 pts·mass was applied to the annealed steel sheet and dried. The dried steel sheet was subjected to a final finish annealing process in which, after having heated the steel sheet taking 100 hours from a temperature of 300° C. to a temperature of 800° C., the steel sheet was heated to a temperature of 1200° C. at a heating rate of 50° C./hr and then subjected to annealing at a temperature of 1200° C. for 5 hours, to prepare a steel sheet having a base film composed mainly of forsterite.

Subsequently, an aqueous solution containing aluminum primary phosphate aqueous solution in an amount of 100 pts·mass in terms of solid content, colloidal silica in an amount of 50 pts·mass in terms of $SiO_2$ solid content, and cordierite in an amount given for each of the cases in Table 2 was diluted with pure water so as to have a specific gravity of 1.20 to prepare a coating solution (here, cordierite was not added in the case of No. 1). The coating solution was applied to the surface of the steel sheet prepared as described above by using a roll coater so that the total coating weight was 7.0 $g/m^2$ on both sides of a steel sheet after having been dried.

A-axis lengths and c-axis lengths of the primary particles of cordierite used in the present examples were varied as in Table 2 as a result of synthesis conditions being varied. Regarding the properties of cordierite in all the cases, the linear thermal expansion coefficients in a temperature range of 25° C. to 800° C. were $2.9\times10^{-6}$/K (a-axis direction) and $-1.0\times10^{-6}$/K (c-axis direction), and the volume thermal expansion coefficient in a temperature range of 25° C. to 800° C. was $4.8\times10^{-6}$/K.

Subsequently, the steel sheet was charged into a drying furnace (at 300° C. for 1 minute) and then subjected to baking at a temperature of 850° C. for 30 seconds in an atmosphere containing 100 vol % of $N_2$.

The dispersion state of cordierite in the insulating film of the sample obtained as described above was checked by observing a cross section which had been prepared by FIB processing by using a backscattered electron image obtained with a SEM to determine, regarding cordierite in the insulating film, the ratio ($L_{RD}/L_{TD}$) of the length in the rolling direction ($L_{RD}$) in a cross section in the rolling direction to the length in a direction perpendicular to the rolling direction ($I_{TD}$) in a cross section in a direction perpendicular to the rolling direction and the length in the thickness direction ($L_{ND}$) in a cross section in a direction perpendicular to the rolling direction. The insulating film thickness (d) was 1.6 μm.

The tension (tension in the rolling direction and tension in a direction perpendicular to the rolling direction provided to the steel sheet) is determined in the following manner. After having taken a steel sheet for determining the tension in the rolling direction (having a length in the rolling direction of 280 mm and a length in a direction perpendicular to the rolling direction of 30 mm) and a steel sheet for determining the tension in a direction perpendicular to the rolling direction (having a length in the rolling direction of 30 mm and a length in a direction perpendicular to the rolling direction of 100 mm) by cutting the sample obtained as described above and performed stress relief annealing (at 800° C. for 2 hours in a $N_2$ atmosphere), one side of each of the steel sheets was masked with an adhesive tape so that the insulating film on this side was not removed, the insulating film on the other side was then removed by immersing the steel sheet in a 25 mass % NaOH aqueous solution at a temperature of 110° C., and the warpage of each of the steel sheet for determining the tension in the rolling direction and the steel sheet for determining the tension in a direction perpendicular to the rolling direction was determined.

The film adhesion property (resistance to peeling due to shearing) was evaluated by observing the length of a region in which an insulating film was peeled off when the sample was sheared in the rolling direction. At the edge of the sheared sample having a length of 20 mm, by determining the length in a direction perpendicular to the rolling direction of the region in which an insulating film was peeled off by performing SEM observation at a magnification of 50 times, a case where the maximum length was 100 μm or less was judged as a case of good adhesion property, and a case where the length was more than 100 μm was judged as a case of poor adhesion property.

The determination of a magnetic property (iron loss ($W_{17/50}$)) was performed by using the method in accordance with JIS C 2550 on a sample having a length in a direction perpendicular to the rolling direction of 30 mm and a length in the rolling direction of 280 mm which had been taken by shearing the obtained sample and which had been subjected to stress relief annealing (at 800° C. for 2 hours in a $N_2$ atmosphere). Here, the magnetic flux density ($B_8$) of all the samples was 1.94 T.

The diameter without peeling in bending was evaluated, after having wound a sample having a length in a direction perpendicular to the rolling direction of 30 mm and a length in the rolling direction of 280 mm which had been taken from the obtained sample around a round bar having a diameter of 60 mm and bent back the bent sample by 180°, by performing visual observation to determine whether or not peeling of an insulating film occurred, and by thereafter repeating the similar observation with a round bar having a diameter 5 mm smaller than the previous one until the minimum diameter (diameter without peeling in bending), with which the peeling of the insulating film was not recognized by visual observation, was found. In this evaluation, it was possible to judge that the smaller the diameter without peeling in bending, the better the film adhesion property, and a case of a diameter without peeling in bending of 30 mm or less was judged as a case of good film adhesion property.

As indicated in Table 2, in the case where $L_{RD}/L_{TD}$ is 1.5 or more and 50.0 or less, since it is possible to provide tension which varies between the rolling direction and a direction perpendicular to the rolling direction, it is possible to obtain an insulating film which is good in terms of both iron loss and film adhesion properties (resistance to peeling due to shearing and diameter without peeling in bending).

TABLE 2

| | Cordierite | | | | | | | | Tension (MPa) | | | | Diameter | |
|---|---|---|---|---|---|---|---|---|---|---|---|---|---|---|
| | Primary Particle Diameter | | Cordierite | Cordierite Content in Insulating | | | | | | Direction Perpen-dicular | Iron Loss | Film Adhesion | Without Peeling In | |
| No | a-Axis (μm) | c-Axis (μm) | Content pts · mass | Film mass % | $L_{RD}$ μm | $L_{TD}$ μm | $L_{ND}$ μm | $L_{RD}/L_{TD}$ | Rolling Direction | to Rolling Direction | $W_{17/50}$ (W/kg) | Property μm | Bending mm | Note |
| 1 | | | 0 | 0 | | | | | 9.4 | 9.3 | 0.88 | 120 | 40 | Conventional Example |
| 2 | 0.8 | 4.5 | 1 | 0.7 | 4.5 | 0.8 | 0.6 | 5.6 | 9.4 | 8.3 | 0.88 | 55 | 30 | Example |

TABLE 2-continued

| No | Cordierite Primary Particle Diameter a-Axis (μm) | Cordierite Primary Particle Diameter c-Axis (μm) | Cordierite Content pts · mass | Cordierite Content in Insulating Film mass % | $L_{RD}$ μm | $L_{TD}$ μm | $L_{ND}$ μm | $L_{RD}/L_{TD}$ | Tension (MPa) Rolling Direction | Tension (MPa) Direction Perpendicular to Rolling Direction | Iron Loss $W_{17/50}$ (W/kg) | Film Adhesion Property μm | Diameter Without Peeling In Bending mm | Note |
|---|---|---|---|---|---|---|---|---|---|---|---|---|---|---|
| 3 | 0.8 | 4.5 | 2 | 1.5 | 4.5 | 0.8 | 0.6 | 5.6 | 9.7 | 8.1 | 0.88 | 56 | 30 | Example |
| 4 | 0.8 | 4.5 | 5 | 3.6 | 4.5 | 0.8 | 0.6 | 5.6 | 10.0 | 7.6 | 0.88 | 55 | 30 | Example |
| 5 | 0.8 | 4.5 | 10 | 7.0 | 4.5 | 0.8 | 0.6 | 5.6 | 10.2 | 6.3 | 0.88 | 52 | 30 | Example |
| 6 | 0.8 | 4.5 | 20 | 13.1 | 5.4 | 3.6 | 0.6 | 1.5 | 11.6 | 7.1 | 0.88 | 87 | 30 | Example |
| 7 | 0.8 | 4.5 | 50 | 27.3 | 6.4 | 5.2 | 0.6 | 1.2 | 12.8 | 12.6 | 0.87 | 116 | 30 | Comparative Example |
| 8 | 0.6 | 9.0 | 1 | 0.7 | 9.0 | 0.6 | 0.5 | 15.0 | 9.4 | 8.2 | 0.88 | 36 | 30 | Example |
| 9 | 0.6 | 9.0 | 18 | 11.9 | 9.3 | 3.1 | 0.5 | 3.0 | 11.3 | 8.3 | 0.85 | 73 | 30 | Example |
| 10 | 0.3 | 9.0 | 10 | 7.0 | 9.0 | 0.3 | 0.2 | 30.0 | 10.3 | 7.3 | 0.83 | 35 | 30 | Example |
| 11 | 0.2 | 15.0 | 15 | 10.1 | 15.0 | 0.4 | 0.2 | 37.5 | 11.2 | 6.8 | 0.88 | 35 | 30 | Example |
| 12 | 1.5 | 2.0 | 5 | 3.6 | 2.0 | 1.5 | 1.2 | 1.3 | 10.0 | 9.9 | 0.88 | 115 | 30 | Comparative Example |
| 13 | 1.5 | 3.0 | 15 | 10.1 | 3.5 | 1.8 | 1.2 | 1.9 | 11.3 | 9.1 | 0.88 | 80 | 30 | Example |
| 14 | 0.7 | 7.0 | 8 | 5.7 | 7.0 | 0.7 | 0.6 | 10.0 | 10.1 | 7.6 | 0.83 | 40 | 30 | Example |
| 15 | 1.5 | 60.0 | 10 | 7.0 | 60.0 | 1.5 | 1.1 | 40.0 | 10.3 | 7.4 | 0.88 | 29 | 30 | Example |
| 16 | 1.2 | 34.0 | 10 | 7.0 | 34.0 | 1.2 | 0.9 | 28.3 | 10.3 | 7.2 | 0.88 | 30 | 30 | Example |
| 17 | 2.4 | 3.6 | 15 | 10.1 | 3.6 | 2.4 | 1.8 | 1.5 | 11.2 | 8.8 | 0.86 | 85 | 30 | Example |
| 18 | 0.3 | 15.0 | 10 | 7.0 | 15.0 | 0.3 | 0.2 | 50.0 | 10.3 | 6.2 | 0.82 | 27 | 30 | Example |
| 19 | 0.4 | 30.0 | 7 | 5.0 | 30.0 | 0.4 | 0.3 | 75.0 | 10.0 | 6.1 | 0.82 | 26 | 60 | Comparative Example |

Underlined portions indicate items out of the ranges of the present invention.

Example 2

After having heated a slab for a silicon steel sheet having a chemical composition containing, by mass %, Si: 3.25%, C: 0.04%, Mn: 0.08%, S: 0.002%, sol.Al: 0.015%, N: 0.006%, Cu: 0.05%, Sb: 0.01% at a temperature of 1150° C. for 20 minutes, hot rolling was performed on the heated slab to obtain a hot rolled steel sheet having a thickness of 2.2 mm. After having performed annealing on the hot rolled steel sheet at a temperature of 1000° C. for 1 minute, cold rolling was performed to obtain a cold rolled steel sheet having a final thickness of 0.23 mm. Subsequently, the cold rolled steel sheet was heated from room temperature to a temperature of 820° C. at a heating rate of 50° C./s and subjected to primary recrystallization annealing at a temperature of 820° C. for 60 seconds in a wet atmosphere (50 vol % of $H_2$, 50 vol % of $N_2$, a dew-point temperature of 60° C.).

After having taken a steel sheet having a length in the rolling direction of 400 mm and a length in a direction perpendicular to the rolling direction of 100 mm from the obtained cold rolled steel sheet which had been subjected to primary recrystallization annealing, an aqueous slurry of an annealing separator containing MgO in an amount of 100 pts·mass and $TiO_2$ in an amount of 10 pts·mass was applied to the steel sheet and dried. The dried steel sheet was subjected to a final finish annealing process in which, after having heated the steel sheet taking 100 hours from a temperature of 300° C. to a temperature of 800° C., the steel sheet was heated to a temperature of 1200° C. at a heating rate of 50° C./hr and then subjected to annealing at a temperature of 1200° C. for 5 hours, to prepare a steel sheet having a base film composed mainly of forsterite.

Subsequently, each of the aqueous solutions containing the components given in Table 3 was diluted with pure water so as to have a specific gravity of 1.25 to prepare a coating solution, and the coating solution was applied to the surface of the steel sheet prepared as described above by using a roll coater so that the insulating film thickness (d) was that given in Table 4 after having been subjected to baking.

Subsequently, the steel sheet was charged into a drying furnace (at 300° C. for 1 minute) and then subjected to baking at a temperature of 850° C. for 30 seconds in an atmosphere containing 100 vol % of $N_2$.

Dispersion state of a crystalline fibrous material (second phase) in the insulating film of the sample obtained as described above was checked by observing a cross section which had been prepared by FIB processing by using a backscattered electron image obtained with a SEM to determine, regarding the crystalline fibrous material in the insulating film, the ratio ($L_{RD}/L_{TD}$) of the length in the rolling direction ($L_{RD}$) in a cross section in the rolling direction to the length in a direction perpendicular to the rolling direction ($L_{TD}$) in a cross section in a direction perpendicular to the rolling direction and the length in the thickness direction ($L_{ND}$) in a cross section in a direction perpendicular to the rolling direction.

The tension, the film adhesion properties, the magnetic property (iron loss ($W_{17/50}$)), and the diameter without peeling in bending were derived as in the case of Example 1. Here, the magnetic flux density ($B_8$) of all the samples was 1.92 T.

As indicated in Table 4, in the case where $L_{RD}/L_{TD}$ is 1.5 or more and 50.0 or less, since it is possible to provide tension which varies between the rolling direction and a direction perpendicular to the rolling direction, it is possible to obtain an insulating film which is good in terms of both iron loss and film adhesion properties (resistance to peeling due to shearing and diameter without peeling in bending). Moreover, it is clarified that a further improvement in iron loss can be expected in the case where a crystalline fibrous material having an anisotropic linear thermal expansion coefficient and a volume thermal expansion coefficient of $30\times10^{-6}$/K or less is contained in the insulating film in such a manner that $L_{ND}/d$ is 0.2 or more.

Incidentally, cordierite ($2MgO \cdot 2Al_2O_3 \cdot 5SiO_2$), $Al_2TiO_5$, and $LaSrAlO_4$ are materials which are known to have anisotropic linear thermal expansion coefficients.

TABLE 3

| Coating Solution No. | Phosphate (g) (Solid Content) | | | | | | | |
|---|---|---|---|---|---|---|---|---|
| | Mg Phosphate | Ca Phosphate | Ba Phosphate | Sr Phosphate | Zn Phosphate | Al Phosphate | Mn Phosphate | Cr Phosphate |
| Coating Solution 1 | 100 | — | — | — | — | — | — | — |
| Coating Solution 2 | — | — | — | — | — | 100 | — | — |
| Coating Solution 3 | 50 | — | — | — | — | 50 | — | — |
| Coating Solution 4 | — | — | — | — | — | — | — | 100 |
| Coating Solution 5 | — | 100 | — | — | — | — | — | — |
| Coating Solution 6 | — | 50 | — | 50 | — | — | — | — |
| Coating Solution 7 | 50 | — | 50 | — | — | — | — | — |
| Coating Solution 8 | — | — | — | — | 50 | 50 | — | — |
| Coating Solution 9 | 80 | — | — | — | — | — | 20 | — |
| Coating Solution 10 | 80 | — | — | — | — | — | 20 | — |
| Coating Solution 11 | — | — | — | — | — | 50 | — | 50 |
| Coating Solution 12 | 100 | — | — | — | — | — | — | — |
| Coating Solution 13 | — | — | — | — | — | — | — | — |

| Coating Solution No. | $Na_2B_4O_5(OH)_4 \cdot 8H_2O$ (g) (Solid Content) | Colloidal Silica (g) (Solid Content) | Fibrous Material (Solid Content) | | |
|---|---|---|---|---|---|
| | | | Kind | Volume Thermal Expansion Coefficient ($10^{-6}$/K) | Content (g) |
| Coating Solution 1 | — | 50 | $2MgO \cdot 2Al_2O_3 \cdot 5SiO_2$ | 4.8 | 10 |
| Coating Solution 2 | — | 50 | $2MgO \cdot 2Al_2O_3 \cdot 5SiO_2$ | 4.8 | 15 |
| Coating Solution 3 | — | 70 | $Al_2O_3$ | 14.8 | 5 |
| Coating Solution 4 | — | 50 | $A_{12}O_3$ | 14.8 | 20 |
| Coating Solution 5 | — | 100 | $MgO \cdot SiO_2$ | 22.3 | 25 |
| Coating Solution 6 | — | 150 | $MgO \cdot SiO_2$ | 22.3 | 30 |
| Coating Solution 7 | — | 120 | $Al_2TiO_5$ | 2.4 | 40 |
| Coating Solution 8 | — | 80 | $Al_2TiO_5$ | 2.4 | 2 |
| Coating Solution 9 | — | 80 | $CaO—ZrO_2$ | 30 | 50 |
| Coating Solution 10 | — | 80 | $Y_2O_3—ZrO_2$ | 34 | 50 |
| Coating Solution 11 | — | 80 | $LaSrAlO_4$ | 28 | 10 |
| Coating Solution 12 | — | 70 | $Sr_2TiO_4$ | 36 | 20 |
| Coating Solution 13 | 40 | 80 | $LaSrAlO_4$ | 28 | 20 |

TABLE 4

| No | Coating Solution No | Fibrous Material Content in Insulating Film mass % | $L_{RD}$ μm | $L_{TD}$ μm | $L_{ND}$ μm | d μm | $L_{RD}/L_{TD}$ | $L_{ND}/d$ | Tension (MPa) Rolling Direction | Tension (MPa) Direction Perpendicular to Rolling Direction | Iron Loss $W_{17/50}$ (W/kg) | Film Adhesion Property μm | Diameter Without Peeling in Bending mm | Note |
|---|---|---|---|---|---|---|---|---|---|---|---|---|---|---|
| 1 | 1 | 7.0 | 4.5 | 0.8 | 0.6 | 2.0 | 5.6 | 0.3 | 12.2 | 7.6 | 0.83 | 53 | 30 | Example |
| 2 | 2 | 10.1 | 5.2 | 3.4 | 0.6 | 2.0 | 1.5 | 0.3 | 12.5 | 8.3 | 0.82 | 56 | 30 | Example |
| 3 | 3 | 3.2 | 6.2 | 2.1 | 1.5 | 2.0 | 3.0 | 0.75 | 10.5 | 8.3 | 0.84 | 83 | 30 | Example |
| 4 | 4 | 13.0 | 7.5 | 2.3 | 1.5 | 2.0 | 3.3 | 0.75 | 10.2 | 8.1 | 0.85 | 85 | 30 | Example |
| 5 | 5 | 11.9 | 3 | 1.2 | 1.1 | 2.0 | 2.5 | 0.55 | 10.0 | 8.0 | 0.85 | 87 | 30 | Example |
| 6 | 6 | 11.3 | 3.2 | 1.3 | 1.2 | 2.0 | 2.5 | 0.6 | 10.0 | 7.8 | 0.85 | 87 | 30 | Example |
| 7 | 7 | 16.2 | 8.1 | 0.8 | 0.6 | 2.0 | 10.1 | 0.3 | 13.4 | 7.1 | 0.82 | 45 | 20 | Example |
| 8 | 8 | 1.2 | 4.0 | 0.6 | 0.5 | 2.0 | 6.7 | 0.25 | 12.6 | 7.5 | 0.83 | 48 | 25 | Example |
| 9 | 9 | 23.4 | 4.5 | 1 | 0.7 | 2.0 | 4.5 | 0.35 | 10.0 | 7.8 | 0.85 | 74 | 30 | Example |
| 10 | 10 | 23.4 | 4.5 | 1 | 0.7 | 2.0 | 4.5 | 0.35 | 9.4 | 7.8 | 0.87 | 73 | 30 | Example |
| 11 | 11 | 5.8 | 3.2 | 0.6 | 0.4 | 2.0 | 5.3 | 0.2 | 11.6 | 6.9 | 0.83 | 34 | 30 | Example |
| 12 | 11 | 5.8 | 3.2 | 0.6 | 0.4 | 3.0 | 5.3 | 0.13 | 11.6 | 9.5 | 0.86 | 34 | 30 | Example |
| 13 | 12 | 11.5 | 3.2 | 0.6 | 0.5 | 2.0 | 5.3 | 0.25 | 11.2 | 9.1 | 0.86 | 43 | 30 | Example |
| 14 | 13 | 14.3 | 3.2 | 0.6 | 0.4 | 2.0 | 5.3 | 0.2 | 11.4 | 7.2 | 0.83 | 42 | 30 | Example |

The invention claimed is:

1. An electrical steel sheet with an insulating film, the steel sheet comprising an insulating film containing a crystalline fibrous material having an aspect ratio of 1.5 or more on a surface of the steel sheet, wherein a ratio ($L_{RD}/L_{TD}$) of a length in a rolling direction ($L_{RD}$) of the crystalline fibrous material in a cross section in the rolling direction of the insulating film to a length in a direction perpendicular to the rolling direction ($L_{TD}$) of the crystalline fibrous material in a cross section in the direction perpendicular to the rolling direction of the insulating film is 1.5 or more and 50.0 or less.

2. The electrical steel sheet with an insulating film according to claim 1, wherein a ratio ($L_{ND}/d$) of a length in a thickness direction ($L_{ND}$) of the crystalline fibrous material in a cross section in the direction perpendicular to the rolling direction of the insulating film to an insulating film thickness (d) is 0.2 or more and 2.0 or less.

3. The electrical steel sheet with an insulating film according to claim 1, wherein a volume thermal expansion coefficient of the crystalline fibrous material in a temperature range of 25° C. to 800° C. is $30\times10^{-6}$/K or less.

4. The electrical steel sheet with an insulating film according to claim 1, wherein a linear thermal expansion coefficient of the crystalline fibrous material in a temperature range of 25° C. to 800° C. is anisotropic.

5. The electrical steel sheet with an insulating film according to claim 1, wherein the insulating film contains a phosphate containing one, two, or more metallic elements selected from Mg, Al, Ca, Ba, Sr, Zn, Ti, Nd, Mo, Cr, B, Ta, Cu, and Mn.

6. The electrical steel sheet with an insulating film according to claim 2, wherein a volume thermal expansion coefficient of the crystalline fibrous material in a temperature range of 25° C. to 800° C. is $30\times10^{-6}$/K or less.

7. The electrical steel sheet with an insulating film according to claim 2, wherein a linear thermal expansion coefficient of the crystalline fibrous material in a temperature range of 25° C. to 800° C. is anisotropic.

8. The electrical steel sheet with an insulating film according to claim 3, wherein a linear thermal expansion coefficient of the crystalline fibrous material in a temperature range of 25° C. to 800° C. is anisotropic.

9. The electrical steel sheet with an insulating film according to claim 6, wherein a linear thermal expansion coefficient of the crystalline fibrous material in a temperature range of 25° C. to 800° C. is anisotropic.

10. The electrical steel sheet with an insulating film according to claim 2, wherein the insulating film contains a phosphate containing one, two, or more metallic elements selected from Mg, Al, Ca, Ba, Sr, Zn, Ti, Nd, Mo, Cr, B, Ta, Cu, and Mn.

11. The electrical steel sheet with an insulating film according to claim 3, wherein the insulating film contains a phosphate containing one, two, or more metallic elements selected from Mg, Al, Ca, Ba, Sr, Zn, Ti, Nd, Mo, Cr, B, Ta, Cu, and Mn.

12. The electrical steel sheet with an insulating film according to claim 4, wherein the insulating film contains a phosphate containing one, two, or more metallic elements selected from Mg, Al, Ca, Ba, Sr, Zn, Ti, Nd, Mo, Cr, B, Ta, Cu, and Mn.

13. The electrical steel sheet with an insulating film according to claim 6, wherein the insulating film contains a phosphate containing one, two, or more metallic elements selected from Mg, Al, Ca, Ba, Sr, Zn, Ti, Nd, Mo, Cr, B, Ta, Cu, and Mn.

14. The electrical steel sheet with an insulating film according to claim 7, wherein the insulating film contains a phosphate containing one, two, or more metallic elements selected from Mg, Al, Ca, Ba, Sr, Zn, Ti, Nd, Mo, Cr, B, Ta, Cu, and Mn.

15. The electrical steel sheet with an insulating film according to claim 8, wherein the insulating film contains a phosphate containing one, two, or more metallic elements selected from Mg, Al, Ca, Ba, Sr, Zn, Ti, Nd, Mo, Cr, B, Ta, Cu, and Mn.

16. The electrical steel sheet with an insulating film according to claim 9, wherein the insulating film contains a phosphate containing one, two, or more metallic elements selected from Mg, Al, Ca, Ba, Sr, Zn, Ti, Nd, Mo, Cr, B, Ta, Cu, and Mn.

17. The electrical steel sheet with an insulating film according to claim 1, wherein the insulating film is a vitreous film.

18. The electrical steel sheet with an insulating film according to claim 1, wherein the c-axis diameter of the crystalline fibrous material is in a range of 2.0 to 60.0 μm.

19. The electrical steel sheet with an insulating film according to claim 1, wherein the crystalline fibrous material is at least one selected from $2MgO \cdot 2Al_2O_3 \cdot 5SiO_2$, $MgO \cdot SiO_2$, $Al_2TiO_5$, CaO—$ZrO_2$, $Y_2O_3$—$ZrO_2$, $LaSrAlO_4$, and $Sr_2TiO_4$.

20. An electrical steel sheet with an insulating film, the steel sheet comprising an insulating film containing cordierite having an aspect ratio of 1.5 or more on a surface of the steel sheet, wherein a ratio ($L_{RD}/L_{TD}$) of a length in a rolling direction ($L_{RD}$) of the cordierite in a cross section in the rolling direction of the insulating film to a length in a direction perpendicular to the rolling direction ($L_{TD}$) of the cordierite in a cross section in the direction perpendicular to the rolling direction of the insulating film is 1.5 or more and 50.0 or less.

21. An electrical steel sheet with an insulating film, the steel sheet comprising an insulating film containing a crystalline fibrous material having an aspect ratio of 1.5 or more on a surface of the steel sheet, wherein a ratio ($L_{RD}/L_{TD}$) of a length in a rolling direction ($L_{RD}$) of the crystalline fibrous material in a cross section in the rolling direction of the insulating film to a length in a direction perpendicular to the rolling direction ($L_{TD}$) of the crystalline fibrous material in a cross section in the direction perpendicular to the rolling direction of the insulating film is 1.5 or more and 50.0 or less, wherein the crystalline fibrous material consists of cordierite.

* * * * *